(12) United States Patent
Ikemoto et al.

(10) Patent No.: US 6,935,378 B2
(45) Date of Patent: Aug. 30, 2005

(54) VIBRATION ABSORBING HOSE

(75) Inventors: Ayumu Ikemoto, Aichi-ken (JP); Tetsuya Arima, Aichi-ken (JP)

(73) Assignee: Tokai Rubber Industries, Ltd. (JP)

( * ) Notice: Subject to any disclaimer, the term of this patent is extended or adjusted under 35 U.S.C. 154(b) by 0 days.

(21) Appl. No.: 10/873,396

(22) Filed: Jun. 22, 2004

(65) Prior Publication Data

US 2004/0256018 A1 Dec. 23, 2004

(30) Foreign Application Priority Data

| Jun. 23, 2003 | (JP) | ........................................ 2003-178063 |
| Jun. 23, 2003 | (JP) | ........................................ 2003-178064 |
| Mar. 29, 2004 | (JP) | ........................................ 2004-097080 |

(51) Int. Cl.$^7$ ............................................. F16L 11/00
(52) U.S. Cl. ........................ 138/121; 138/122; 138/126; 138/124; 138/137; 428/36.91; 428/36.4
(58) Field of Search ................................ 138/121, 122, 138/126, 124, 137, 140, 172; 428/36.91, 36.4

(56) References Cited

U.S. PATENT DOCUMENTS

| 4,269,234 | A | * | 5/1981 | Johnson et al. ............. 138/121 |
| 4,960,648 | A | * | 10/1990 | Yamada .................... 428/476.3 |
| 6,085,797 | A | * | 7/2000 | Grabaum et al. ........... 138/121 |
| 6,090,326 | A | * | 7/2000 | Hirohata et al. ............ 264/310 |
| 6,279,615 | B1 | | 8/2001 | Iio et al. ...................... 138/137 |
| 6,448,308 | B1 | * | 9/2002 | Suzuki et al. ............... 523/205 |

* cited by examiner

*Primary Examiner*—Patrick Brinson
(74) *Attorney, Agent, or Firm*—Andrus, Sceales, Starke & Sawall, LLP

(57) ABSTRACT

A vibration absorbing hose including a corrugated portion has multi-layered construction of tubular inner rubber layer, pressure resistant reinforcement layer circumscribing an outer side of the inner rubber layer and outer rubber layer as outermost cover layer. The pressure resistant reinforcement layer is formed, for example, by providing reinforcing yarns, so as to have corrugations along the corrugated portion of the inner rubber layer. The inner rubber layer contains scaly filler in an amount of 50 phr to 200 phr so as to be oriented in a stretching direction of the inner rubber layer. The scaly filler has an aspect ratio of 2 to 90.

14 Claims, 13 Drawing Sheets

VIBRATION ABSORBING HOSE

BACKGROUND OF THE INVENTION

The present invention relates to a vibration absorbing hose, more specifically to a vibration absorbing hose which is excellent in pressure resistance and gas permeation resistance, and suitable for plumbing in an engine room for a motor vehicle.

In the past, a tubular rubber hose mainly composed of rubber elastic material has been widely used in a variety of plumbing or piping means for industrial and automotive applications. As such rubber hose has excellent vibration absorbing property, it is often arranged in vibration regions for the purpose of restraining vibration transmission.

For example, in case of plumbing hose such as hose for fuel system or refrigerant conveying hose (air conditioner hose) used in an engine room of a motor vehicle, the plumbing hose serves as to absorb engine vibration, compressor vibration of an air conditioner and other various vibration generated during car driving, and to restrain transmission of the vibration from one member to the other member which are joined via the plumbing hose.

Meanwhile, regardless of industrial or automotive applications, hoses for oil system, fuel system, water system and refrigerant system are formed in multi-layered construction including inner rubber layer, outer rubber layer and reinforcement layer interposed between the inner and outer rubber layers, for example, as disclosed in the Patent Document 1 below. The reinforcement layer is typically constructed by arranging or braiding reinforcing yarns.

FIG. 11 shows construction of a refrigerant conveying hose (air conditioner hose) which is disclosed in the Patent Document 1. The refrigerant conveying hose has multi-layered construction. Reference numeral 200 in FIG. 11 indicates tubular inner rubber layer. Resin inner layer 202 is formed or laminated in an inner side of the inner rubber layer 200. And, first reinforcement layer 204 is formed or laminated on an outer side of the inner rubber layer 200, and second reinforcement layer 206 is formed or laminated on an outer side of the first reinforcement layer 204 with intervening intermediate rubber layer 208 between the first and the second reinforcement layers 204, 206. The first reinforcement layer 204 is formed by winding reinforcing yarn or yarns spirally while the second reinforcement layer 206 is formed by winding reinforcing yarn or yarns spirally in the reverse direction to the winding direction of the first reinforcement layer 204. Further, outer rubber layer 210 is formed or laminated on outer side of the second reinforcement layer 206 as outermost layer which serves as cover layer.

In this example, the reinforcement layers 204, 206 are formed by arranging or winding reinforcing yarns spirally. On the other hand, such reinforcement layer is also likewise formed by braiding or braid-weaving reinforcing yarns. FIG. 12 shows an example of a hose having such braided reinforcement layer. Reference numeral 212 in FIG. 12 indicates reinforcement layer which is formed by braiding reinforcing yarns between the inner rubber layer 200 and the outer rubber layer 210. In this example, resin inner layer 202 is also formed in an inner side of the inner rubber layer 200.

As noted from these examples, all of conventional hoses which have been provided including reinforcement layer therein are shaped straight-sided or straight-walled tube having inner and outer side surfaces which are straight in a longitudinal direction. Meanwhile, in case of such straight-sided tubular hose, the hose needs to be designed to have a length according to rigidity of the hose in order to ensure favorable vibration absorbing property.

In particular, compared to low-pressure hoses for fuel system, water system or the like, a longer length is required for high pressure hoses such as those for oil system (for example, power steering system) or refrigerant system (refrigerant conveying system) to ensure sufficient vibration absorbing property and reduce transmission of noise and vibration to vehicle interior, with corresponding increases in rigidity of the hoses. For example, in case of refrigerant conveying hose, typically the hose of 300 mm to 600 mm in length is adapted to secure vibration absorbing property and reduce transmission of noise and vibration, even for plumbing or piping for direct distance of 200 mm.

However, an engine room is crammed with variety of components and parts. And, specifically in these days, due to necessity to ensure a compartment space as large as possible, an engine room has been designed in compact size and space or clearance in the engine room has been more and more narrowed. Therefore, under the circumstances, if a long hose is arranged in the engine room, it bothers an design engineer to design plumbing arrangement to avoid interference with other components or parts and an operator to handle the hose when arranging the hose in the engine room. Further, such plumbing design and handling of the hose according to types of a motor vehicle should be devised. These result in excessive work load in mounting and assembling vehicle parts and components.

In view of foregoing aspects, it is demanded to develop a rubber hose (rubber-elastic-material hose) of which properties such as vibration absorbing property are improved. One of the means to design the hose in short length without loosing favorable vibration absorbing property is to form the hose with corrugations. Actually, the following Patent Document 2 discloses a fuel hose (a hose for fuel system) of motor vehicle which is provided with corrugations.

FIG. 13 is a view to explain the fuel hose disclosed in the Patent Document 2. In FIG. 13 reference numeral 214 indicates tubular rubber layer, and reference numeral 216 indicates resin inner layer which is formed in the inner surface of the rubber layer 214. As shown in FIG. 13, the fuel hose is provided with corrugated portion 218. Therefore, in this fuel hose, it is possible to effectively absorb generated vibration thanks to flexibility of the corrugated portion 218 in spite of short length of the fuel hose.

Meanwhile, just by providing the hose with corrugated portion 218 as shown in FIG. 13, flexibility can be obtained, but sufficient pressure resistance cannot be ensured. That is, the hose of the disclosure is called a filler hose, and is adapted to a fuel filler opening. Therefore, pressure resistance is not specifically required for the hose of the disclosure. The construction of the hose shown in FIG. 13, wherein bursting pressure is under 1 MPa, may be adapted to a low-pressure hose such as filler hose, but may not be adapted without modification to a hose for which high-pressure resistance is required.

One of means to provide a hose including such corrugated portion or corrugations with pressure resistance may be to form on the hose a reinforcement layer which has a considerable reinforcing effect. The reinforcement layer should not diminish flexibility which the corrugations inherently have, and should be easily and favorably formed on outer surface side of the rubber layer.

Further, in case that a vibration absorbing hose is applied as air conditioner hose for conveying refrigerant or the like, for example, in an engine room of a motor vehicle, the hose is required to have gas permeation resistance, namely, impermeability to gas from the inside to the outside of the hose, and impermeability to water from the outside to the inside thereof as well as pressure resistance and vibration absorbing property. In such a case, the hose should be provided with gas permeation resistance, in addition to pressure resistance and vibration absorbing property.

| Patent Document 1 | JP, A, 7-68659 |
| --- | --- |
| Patent Document 2 | U.S. Pat. No. 6,279,615 |

Under the circumstances described above, it is an object of the present invention to provide a novel vibration absorbing hose which has excellent pressure resistance and gas permeation resistance, and does not loose sufficient vibration absorbing property if formed short in length.

SUMMARY OF THE INVENTION

According to the present invention, provided is a vibration absorbing hose comprises tubular rubber layer (rubber-elastic material layer) having corrugations (for example, a corrugated portion), pressure resistant reinforcement layer laminated on an outer surface side of the rubber layer. The pressure resistant reinforcement layer is laminated, for example, in close contact relation with the corrugations of the rubber layer along an entire length thereof. The pressure resistant reinforcement layer is formed shaped corresponding to the corrugations, for example, including reinforcing yarn or yarns provided, for example, interlaced, woven, wound or spiraled along the corrugations. Here, for example, the pressure resistant reinforcement layer is gradually laminated on the corrugations with providing the reinforcing yarn or yarns along the corrugations. May be applied such pressure resistant reinforcement layer as including reinforcing yarn or yarns knitted along the corrugations or wound spirally along the corrugations to form layer of shape corresponding to the corrugations. However, it is preferred to employ the pressure resistant reinforcement layer including the reinforcing yarns braided along the corrugations to form layer of shape corresponding to the corrugations. In other words, may be applied the means to form the pressure resistant reinforcement layer by braiding the reinforcing yarns along the corrugations. Further, it is effective to laminate a covering layer on an outer surface side of the pressure resistant reinforcement layer. Here, the covering layer may preferably be formed from a rubber-made layer or an outer rubber-made layer (rubber-elastic-material-made layer or outer rubber-elastic-material-made layer).

According to the present invention, the corrugations ensure favorable flexibility of the vibration absorbing hose. So, if the hose is formed short in length, favorable vibration absorbing property is achieved. That is, the present invention allows required hose length relatively short or short while ensuring favorable vibration absorbing property to the hose. This makes it possible to solve outstanding problems associated with plumbing hose specifically arranged in an engine room of motor vehicle for which pressure resistance is required, such as plumbing design or handling of the hose during mounting work. Further, by making a required hose length short, there may be obtained another benefit of high degree of design freedom.

In the present invention, for example, as the pressure resistant reinforcement layer includes reinforcing yarn or yarns provided along the corrugations to form layer shaped corresponding to the corrugations, the vibration absorbing hose may be provided with favorable or uniform pressure resistance. The present invention may ensure both excellent vibration absorbing property and pressure resistance to the hose.

According to the present invention, the pressure resistant reinforcement layer is laminated by providing the reinforcing yarn or yarns along the corrugations to form layer shaped corresponding to the corrugations. So, for example, corrugation hills and valleys are easily reinforced uniformly. Or, for example, the entire corrugations are easily reinforced uniformly. More specifically, the pressure resistant reinforcement layer could be also constructed such that fabric is formed by braiding reinforcing yarns in advance and then wound around an outer surface side of the rubber layer. However, in this case, as the fabric should be deformed so as to correspond to the corrugations, the fabric is apt to have slack or wrinkles on corrugation hills or valleys. So, depending on circumstances, it could be difficult to form the pressure resistant reinforcement layer having a uniform reinforcement effect for the rubber layer. Furthermore, in case that the pressure resistant reinforcement layer is formed by providing the reinforcing yarns along the corrugations, the pressure resistant reinforcement layer may be formed seamless and continuous in both circumferential and longitudinal directions, different from the pressure resistant reinforcement layer formed by winding the fabric around the rubber layer. Therefore, the pressure resistant reinforcement layer may enhance pressure resistance of the hose effectively. And, at the same time, there is no problem that the pressure resistant reinforcement layer considerably disturbs flexibility originated from the corrugations. Further, in one of aspects of the present invention, the pressure resistant reinforcement layer may be easily constructed in production of a vibration absorbing hose, and consequently production cost of the hose may be lowered.

It is desired to provide, for example, braid the reinforcing yarn or yarns at a providing angle (an angle at which the reinforcing yarn or yarns are provided, for example, with respect to the longitudinal direction), for example, a braiding angle, generally equal in corrugation hills and valleys or between the corrugation hills and valleys, for example, during braiding by controlling pulling speed of the reinforcing yarns at braiding machine. If a providing angle, for example, a braiding angle is larger than a neutral angle (54.44°), the vibration absorbing hose tends to be elongated in a longitudinal direction of the hose when internal pressure is exerted thereto. On the contrary, if the providing angle, for example, the braiding angle is smaller than the neutral angle, the vibration absorbing hose tends to expand in a radial direction. That is, the vibration absorbing hose behaves according to the providing angle, for example, the braiding angle when internal pressure is exerted thereto. So, unless the providing angle, for example, the braiding angle is equal in the corrugation hills and valleys, or between the corrugation hills and valleys, as the vibration absorbing hose behaves differently in corrugation hills and valleys during subject to the operation, it is afraid that pressure resistance is decreased.

The pressure resistant reinforcement layer formed by winding the reinforcing yarns spirally may be constructed from first reinforcing layer formed by winding reinforcing yarn or yarns in one direction and second reinforcing layer formed by winding reinforcing yarn or yarns in the reverse direction to the winding direction of the first reinforcing layer. The pressure resistant reinforcement layer may be formed by knitting the reinforcing yarn or yarns in either circumferential or longitudinal direction, or by knitting so that knitted loops continue in either longitudinal or circumferential direction. The pressure resistant reinforcement layer knitted in either direction is excellent in stretchability, and therefore has a feature of not decreasing flexibility of the vibration absorbing hose having corrugations.

The corrugations (corrugated portion) may be formed in spirally corrugated pattern where corrugation hills and valleys respectively are continuous in a longitudinal direction of the vibration absorbing hose, and also in annularly corrugated pattern where longitudinally adjacent corrugation hills and longitudinally adjacent corrugation valleys are discontinuous and independent each other.

According to the present invention, scaly filler is contained, filled or added in the rubber layer in an amount of 50 phr to 200 phr and oriented in a stretching direction or extending direction of the rubber layer, namely in a direction generally perpendicular to thickness of the rubber layer. By constructing the rubber layer in such manner that the scaly filler is contained in the rubber layer and distributed so as to be oriented in a suitable direction or predetermined direction, a gas permeation resistance of the rubber layer may be effectively enhanced. If the scaly filler is contained in the rubber layer so as to be oriented in a stretching or extending direction of the rubber layer, the scaly filler acts as barrier or obstacle against gas particles which tend to move dispersedly in a wall-thickness direction of the rubber layer. This may effectively restrain the gas particles from permeating in the wall-thickness direction through the rubber layer.

However, in order to provide a desirable gas permeation resistance with the hose, the scaly filler is required to be contained, filled or added in the rubber layer in an amount of 50 phr to 200 phr (50 parts to 200 parts per hundred of rubber or polymer in the rubber layer or 50 parts to 200 parts by weight per hundred by weight of rubber or polymer in the rubber layer). If a blending amount or contents of the scaly filler is under 50 phr, it has a small effect in improvement of gas permeation resistance. If the blending amount or contents of the scaly filler is over 200 phr, the rubber layer becomes hard or stiff, hose elasticity, and thus vibration absorbing property is damaged. The blending amount of the scaly filler is more preferably in a range of 100 phr to 180 phr.

Preferably, there is applied the scaly filler having an aspect ratio, which is defined by average diameter/thickness, of 2 to 90. If the scaly filler has an aspect ratio of under 2, the scaly filler has low orientation property with respect to the rubber layer, its barrier property against gas particles is decreased, and it is difficult to achieve sufficient gas permeation resistance. On the other hand, if the scaly filler has an aspect ratio of over 90, dispersibility of the scaly filler is lowered at mixing or incorporation stage, and the scaly filler hardly disperses uniformly in the rubber layer. Further, molding property is lowered at molding of the rubber layer. The aspect ratio of the scaly filler is more preferably in a range of 15 to 70.

Preferably, there is applied the scaly filler has an average diameter of 0.1 $\mu$m to 700 $\mu$m. The scaly filler with an average diameter of under 0.1 $\mu$m has a small effect in improvement of gas permeation resistance, and the scaly filler with an average diameter of over 700 $\mu$m lowers dispersibility at mixing stage and molding property of the rubber layer. The average diameter of the scaly filler is more preferably in a range of 1 $\mu$m to 100 $\mu$m.

According to the present invention, such scaly filler may be or may be formed from talc, mica, sericite, montmorillonite or other materials such as silica and clay.

In the present invention, carbon black may be contained or blended in the rubber layer according to need. In this occasion, a blending amount or contents of the carbon black may be adjusted depending on a required tensile property and/or hardness. The carbon black may be blended typically in an amount of 20 phr to 150 phr, preferably in an amount of 40 phr to 100 phr.

As for vulcanizing agent for the rubber layer, sulfur or resin is applicable. However, preferably, resin vulcanizing agent with favorable heat resistance is applicable. And, the blending amount or contents of the vulcanizing agent is preferably in a range of 5 phr to 20 phr, more preferably in a range of 7 phr to 12 phr.

And, a softening agent may be contained, blended or added in the rubber layer. The softening agent may give a large effect to gas permeation resistance of the rubber layer. The more softening agent is blended, the more the gas permeation resistance lowers. Therefore, in the present invention, blending amount or additive amount of the softening agent is preferably maximum 5 phr, namely in a range of 0 phr to 5 phr, and more preferably in a range of 0 to 2 phr.

The vibration absorbing hose may further comprise a resin membrane which is laminated in an inner surface of the rubber layer, or on an outer surface of the rubber layer and in an inner side of the pressure resistant reinforcement layer. As in this construction, gas barrier performance is improved by the resin membrane, gas permeation resistance of the vibration absorbing hose may be enhanced, for example, remarkably. The resin membrane may be formed by electrostatic coating or spraying.

In the present invention, preferably, the resin membrane may be formed from polyamide resin or polyamide type resin, or fluoro-resin or fluoro-type resin.

The resin membrane may be formed in such manner that negatively or positively charged resin powder is sprayed to the rubber layer which acts as counter electrode, the resin powder is attached to the inner or outer surface of the rubber layer by electrostatic attraction, and then the attached resin powder is melted by heating and cooled.

However, there are some other means than electrostatic coating to laminate the resin membrane in or on the rubber layer. The resin membrane may be formed in the inner surface or on the outer surface of the rubber layer by injection molding. Or the resin membrane may be formed in such manner that parison is formed by extruding a molten resin with an extruder and the parison is attached and laminated in the inner surface or on the outer surface of the rubber layer by blow molding.

A wall thickness or thickness of the resin membrane is preferably maximum 0.3 mm or 300 $\mu$m. The reason is that as the wall thickness is larger, the vibration absorbing hose becomes entirely hard or stiff, and vibration absorbing property is deteriorated. However, in injection molding, it is difficult to form the resin membrane with thickness 0.3 mm or 300 $\mu$m or less. In blow molding, it is difficult to form the resin membrane with uniform thickness. By employing electrostatic coating, it is possible to form the resin membrane easily with thin and uniform wall thickness.

However, in the present invention, more preferably the resin membrane has a thickness of 50 $\mu$m to 250 $\mu$m. If the resin membrane has a thickness smaller than 50 $\mu$m, sufficient gas permeation resistance cannot be obtained. On the contrary, if the resin membrane has a thickness larger than 250 $\mu$m, gas permeation resistance is favorable, but vibration absorbing property of the hose is deteriorate as the resin membrane becomes hard or stiff according to circumstances.

Here, in order to form the resin membrane favorably by electrostatic coating, the rubber layer is formed preferably to have a volume resistivity value or a volume resistivity of maximum $1\times10^6 \Omega$-cm, or of $1\times10^6 \Omega$-cm or less. The volume resistivity value in the rubber layer may be controlled by adjusting blending quantity of carbon black therein. The rubber layer where the volume resistivity value is adjusted to maximum $1\times10^6 \Omega$-cm in this manner may result in favorable electrostatic coating of resin powder, restraint of defects such as uneven wall thickness or pinholes, and therefore favorable gas permeation resistance.

According to the present invention, provided is a vibration absorbing hose having sufficient flexibility, and bursting pressure of minimum 1 Mpa. The vibration absorbing hose of the present invention is specifically suitable for application of plumbing in an engine room of a motor vehicle with construction which is suitable for plumbing hose to be arranged in an engine room of a motor vehicle.

Figure 1:
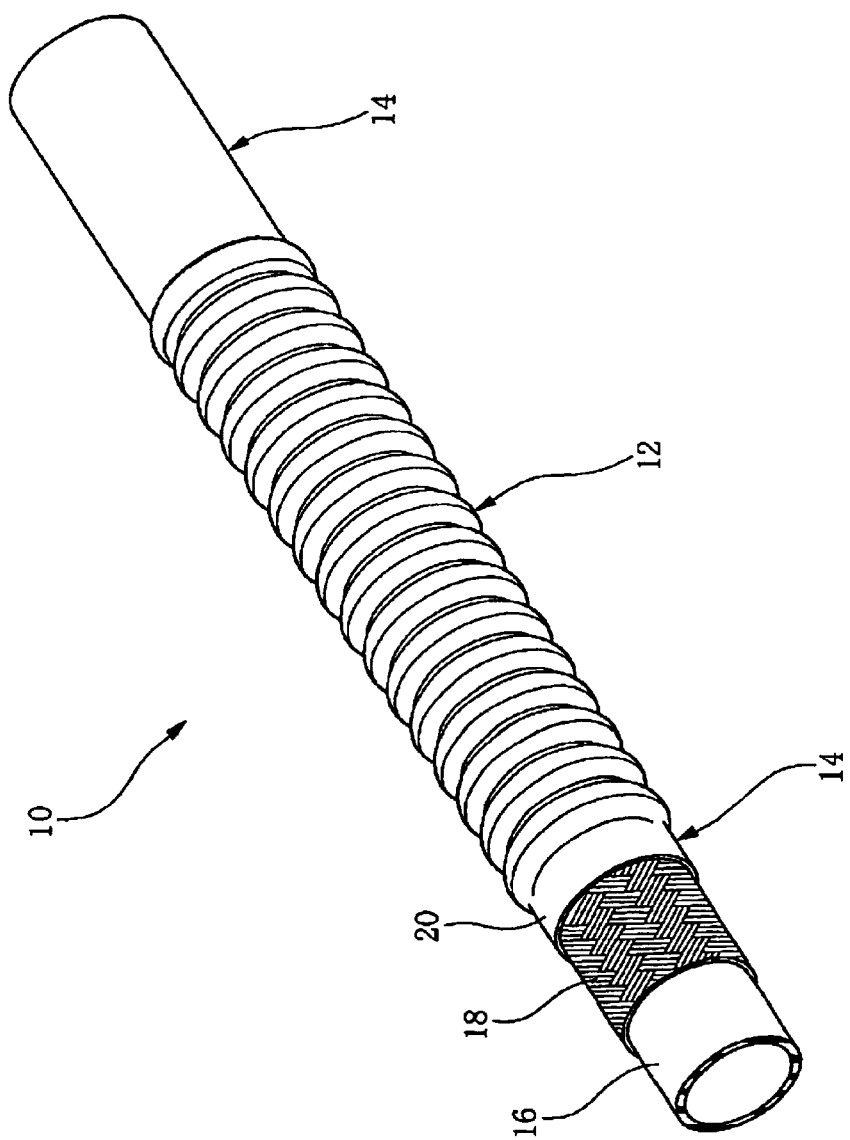
FIG. 1 is a partly cutaway perspective view of a vibration absorbing hose according to the present invention.

Now, the preferred embodiments of the present invention will be described in detail with reference to the drawings.

DETAILED DESCRIPTIONS OF PREFERRED EMBODIMENTS

A vibration absorbing hose 10 (hereinafter simply referred to as a hose 10) according to the present invention shown in FIGS. 1 and 2, which is applied, for example, as refrigerant conveying hose (air conditioning hose), is provided with pressure resistance and gas permeation resistance. The hose 10 has a corrugated portion 12 extending relatively long or for substantially entire part of the hose 10, and end portions 14, 14 of straight-sided tubular shape or straight cylindrical shape. The hose 10 has multi-layered construction, tubular inner rubber layer (inner rubber-elastic-material layer) 16 (rubber layer), pressure resistant reinforcement layer 18 which circumscribes an outer side of the inner rubber layer 16, and outer rubber layer (outer rubber-elastic-material layer) 20 as outermost cover layer.

In the hose 10, the pressure resistant reinforcement layer 18 is formed or constructed by braiding reinforcing yarns or filament member 19 (refer to FIG. 4) over and along an outer surface of the tubular inner rubber layer 16, more specifically along straight cylindrical shape of the both end portions 14, 14 and corrugations therebetween. Therefore, the pressure resistant reinforcement layer 18 is formed in straight cylindrical shape at both end portions 14, 14 and in shape corresponding to corrugations or in corrugated shape, for example, in shape having corrugation hills and valleys in the corrugated portion 12 between the both end portions 14, 14. The pressure resistant reinforcement layer 18 is laminated on an outer side of the inner rubber layer 16 entirely in contact or close contact relation with the outer surface thereof.

The inner rubber layer 16 in the hose 10 may be formed from isobutylene-isoprene rubber (IIR), halogenated IIR (chloro-IIR (Cl-IIR or ClIR), bromo-IIR (Br-IIR or BIIR)), acrylonitrile-butadiene-rubber (NBR), chloroprene rubber (CR), ethylene-propylene-diene-rubber (EPDM), ethylene-propylene copolymer (EPM), fluoro rubber (FKM), epichlorohydrin rubber or ethylene oxide copolymer (ECO), silicon rubber, urethane rubber, acrylic rubber or the like. These materials are applied in single or blended form for the inner rubber layer 16.

For the reinforcing yarns or filament member 19 forming the pressure resistant reinforcement layer 18, polyethylene terephthalate (PET), polyethylene naphthalate (PEN), aramid, polyamide or nylon (PA), vynilon, rayon, metal wire or the like may be adapted.

The outer rubber layer 20 may be formed also from every kind of rubber materials cited above as material for the inner rubber layer 16. In addition, heat-shrink tube and thermoplastic elastomer (TPE) tube are also applicable for the outer rubber layer 20. As for material of such heat-shrink tube and TPE tube, acryl type, styrene type, olefin type, diolefin type, polyvinyl chloride type, urethane type, ester type, amide type, fluorine type or the like may be applied. According to this embodiment, the hose 10 is designed to have an inner diameter of approximately 5 mm to 50 mm.

The inner rubber layer 16 is formed, for example, from material suitably selected according to a fluid flowing inside thereof. However, in case that the hose 10 is applied for hydrofluorocarbon (HFC) type refrigerant conveying hose, specifically IIR or halogenated IIR in single or blended form may be preferably used. It is also effective to apply IIR or halogenated IIR in single or blended form to the outer rubber layer 20.

Figure 3:
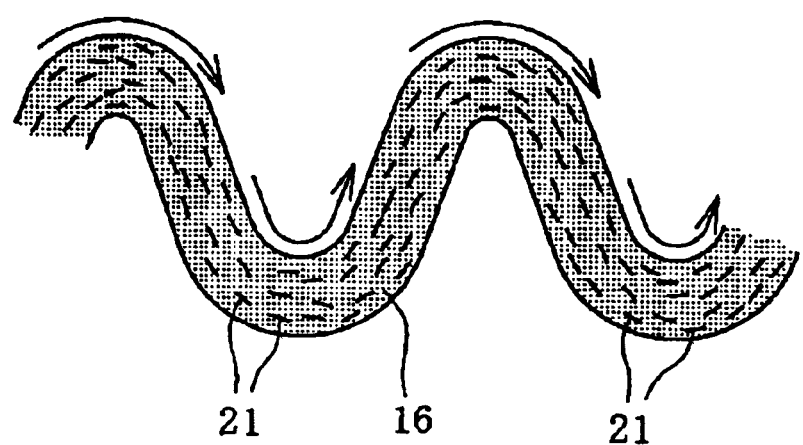
FIG. 3 is a view showing an orientation state of scaly filler.

As shown in FIG. 3, scaly filler 21 is contained in the inner rubber layer 16 in an amount of 50 phr to 200 phr. The scaly filler 21 is, as shown in FIG. 3, oriented in a longitudinal or axial direction of the hose 10, to be exact, in a stretching direction or an extending direction of the inner rubber layer 16 (in a direction generally perpendicular to a wall-thickness of the inner rubber layer 16). For example, the scaly filler 21 is contained or oriented so as to extend in the same direction as the inner rubber layer 16 stretching or extending (in a direction generally perpendicular to a wall-thickness of the inner rubber layer 16).

Orientation of the scaly filler 21 in the above direction may be easily brought about by flow of rubber in the same direction during molding process of the inner rubber layer 16, namely the scaly filler 21 may be easily oriented in the above direction by rubber flow caused during molding of the inner rubber layer 16. Meanwhile, carbon black is blended in the inner rubber layer 16 in an amount of 20 phr to 150 phr.

Figure 2:
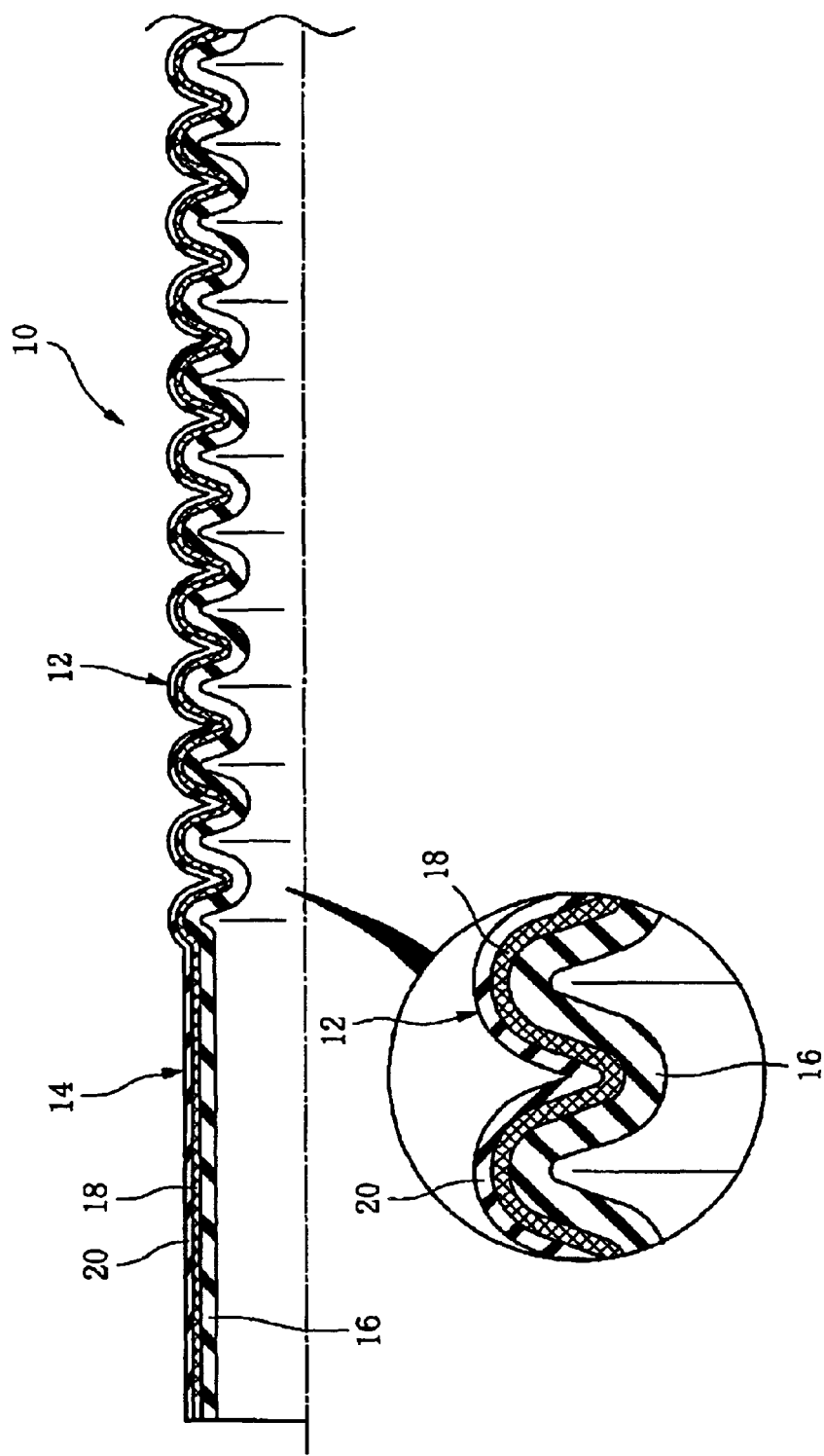
FIG. 2 is a sectional view of the vibration absorbing hose, taken along a longitudinal direction thereof.

The hose 10 as shown in FIGS. 1 and 2 may be manufactured, for example, in the following manner. First, the inner rubber layer 16 including corrugated portion is formed by injection molding, blow molding or the like. At this time, the scaly filler 21 which is blended in rubber material of the inner rubber layer 16 is oriented along the flow of the rubber material shown by arrows in FIG. 3.

Figure 4:
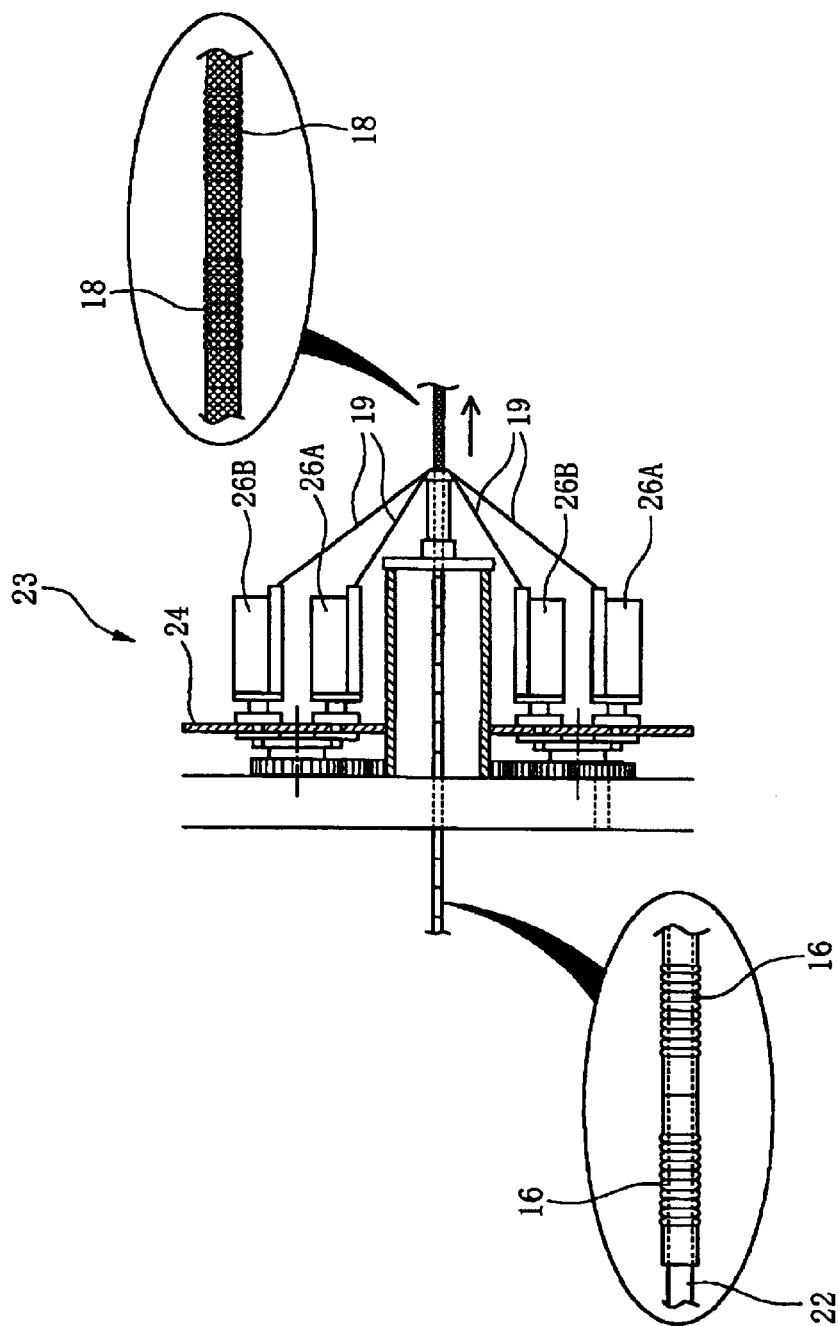
FIG. 4 is an explanatory view of a relevant part of production process of the vibration absorbing hose.

The molded inner rubber layer 16, for example, a plurality of the molded inner rubber layers 16 are slid on a long mandrel (for example, resin mandrel) 22 as shown FIG. 4. Next, the mandrel 22 with the inner rubber layer 16 thereon is mounted in a center hole of a braiding machine 23 shown in FIG. 4. Then, the mandrel 22 is carried forward. The reinforcing yarns 19 are braided on the outer surface of the inner rubber layer 16 as the mandrel 22 is carried.

The braiding machine 23 has a disk-like deck plate 24 and a plurality of paired carriers 26A and 26B which are disposed along a circumference of the deck plate 24. The carriers 26A and 26B of each pair follow a figure of eight respectively while the deck plate 24 rotates around the center thereof, and thereby the reinforcing yarns 19 are braided on the outer surface of the inner rubber layer 16. During braiding procedure, a pulling speed of the reinforcing yarns 19 is controlled so that braiding angle is generally equal in the corrugation hills and valleys of the corrugated portion 12, between the corrugation hills and valleys, or throughout entire corrugated portion 12. Here, the reinforcing yarn or yarns 19 are braided closely and intimately such that rubber layer 16 is not seen therethrough.

And, the inner rubber layer 16 which is laminated with the pressure resistant reinforcement layer 18 by braiding the reinforcing yarns 19 on an outer surface thereof as stated above is then dipped into a liquid compound for the outer rubber layer 20 subsequently to be coated with the outer rubber layer 20 on an outer side thereof. Next, the product laminated with the outer rubber layer 20 is put into a dry kiln for drying.

After dried, the mandrel 22 is removed and an elongate multi-layered hose product is obtained. Then, for example, the hose product is cut into desired length and thereby the hose 10 shown in FIGS. 1 and 2 is obtained. This is one example of production methods of the hose 10. The hose 10 may be produced in any other methods.

The hose 10 in the above-mentioned embodiment may ensure favorable flexibility of itself by the corrugated portion 12. Accordingly, if the hose 10 is designed short in length, favorable vibration absorbing property may be ensured in the hose 10. That means, the hose 10 ensures favorable vibration absorbing property while the required hose length is shortened. This may solve problem with respect to plumbing design in an engine room of a motor vehicle or handling of a plumbing hose during mounting of the plumbing hose.

Additionally, it also increases freedom to design plumbing layout to enable the required hose length short. And, favorable pressure resistance may be ensured by the pressure resistant reinforcement layer 18 formed by braiding the reinforcing yarns 19 along the corrugations.

In the hose 10, the pressure resistant reinforcement layer 18 may be laminated on the outer surface side of the inner rubber layer 16 in shape favorably along the corrugations or favorable corrugated shape so as to reinforce uniformly the corrugation hills and valleys in the corrugated portion 12 and there is no poor reinforcement region. So, as the hose 10 does not have a portion which is easily broken or cracked when internal pressure is exerted to the hose 10, the hose 10 has improved overall pressure resistance. At the same time, as the pressure resistant reinforcement layer 18 is formed in shape corresponding to the corrugations or in corrugated shape along the corrugated portion 12 of the inner rubber layer 16, there is no problem that flexibility originated with the corrugated portion 12 is largely disturbed by providing the pressure resistant reinforcement layer 18.

Furthermore, as the pressure resistant reinforcement layer 18 may be formed seamless and continuous in both circumferential and longitudinal directions, the pressure resistant reinforcement layer 18 may enhance pressure resistance of the hose 10 effectively. And, in production process of the hose 10, the pressure resistant reinforcement layer 18 may be formed easily, and thereby the production cost of the hose 10 is lowered.

And, in the hose 10, as the scaly filler 21 is contained in the inner rubber layer 16 in an amount of 50 phr to 200 phr and oriented in the rubber layer 16 in a stretching direction thereof, gas permeation resistance of the hose 10 may be effectively enhanced without lowering vibration absorbing property thereof.

EXAMPLE 1

Figure 5:
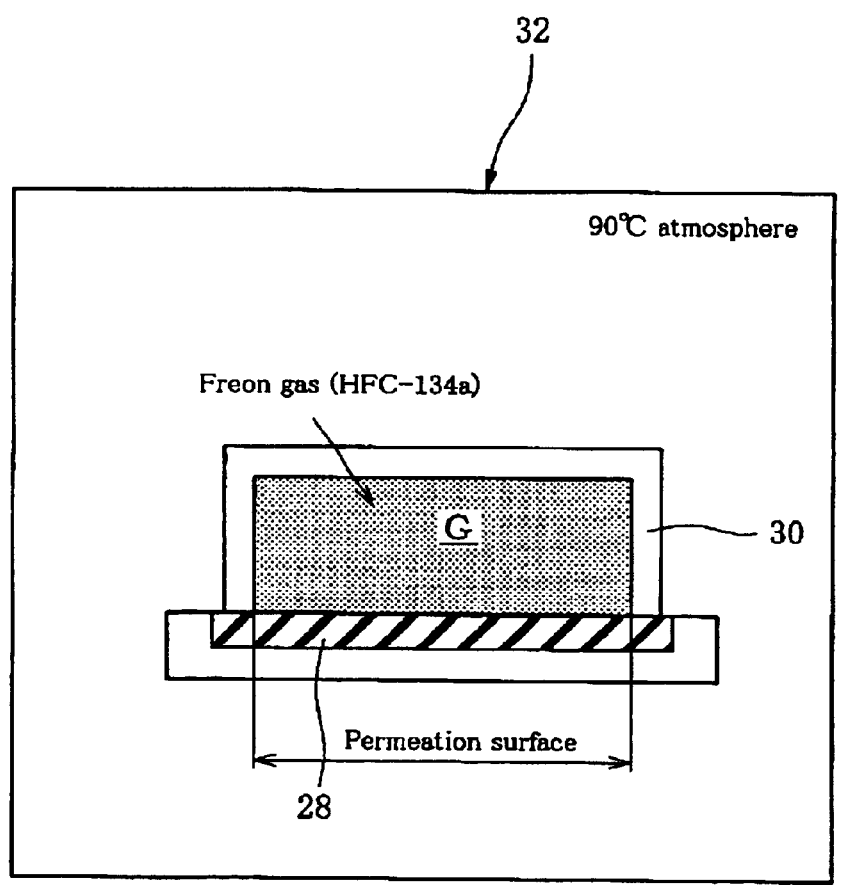
FIG. 5 is a view showing measuring method of gas permeation resistance of examples of the vibration absorbing hose and comparative example or examples in order to confirm effects of the vibration absorbing hose.

The inner rubber layers A, B, C, D, E, F, G and H having corrugations of Example 1 (inner rubber layer 16) are formed from materials blended as shown in Table 1, and Comparative Example A is formed from materials blended as shown in Table 1 and with the same shape as the Example 1. Aside from these, rubber sheets 28 shown in FIG. 5 is formed from materials blended as shown in Table 1 and vulcanized. Then, the rubber sheets 28 are evaluated with respect to hardness and gas permeation resistance. The results are also shown as property of sheet in Table 1.

TABLE 1

| Blending agent/ properties | | Comparative Example | Example 1 | | |
|---|---|---|---|---|---|
| | | A | A | B | C |
| IIR/C1-IIR | Blending ratio | 50/50 | 50/50 | 50/50 | 50/50 |
| Stearic acid | Blending amount (phr) | 1 | 1 | 1 | 1 |
| Zinc oxide | Blending amount (phr) | 5 | 5 | 5 | 5 |
| Carbon black (FEF) | Blending amount (phr) | 60 | 60 | 60 | 60 |
| Filler (scaly filler) | Kind or type | — | Mica | Mica | Talc |
| | Aspect ratio | — | 20 | 92 | 30 |
| | Average diameter | — | 18 | 430 | 7.5 |

TABLE 1-continued

| Blending agent/ properties | | | | | |
|---|---|---|---|---|---|
| | (μm) Blending amount (phr) | — | 100 | 100 | 40 |
| Softening agent (Naphthen type processed oil) | Blending amount (phr) | 5 | 2 | 2 | 2 |
| Vulcanizing agent (resin vulcanizing agent) | Blending amount (phr) | 10 | 10 | 10 | 10 |
| Processing property | Molding property of corrugated tube | . | . | X | . |
| Property of sheet | Permeation of freon (90° C., mg/cm² day) | . | . | . | X |
| | Hardness test (HA) | 65 | 74 | 75 | 70 |

| Blending agent/ properties | | Example 1 | | | | |
|---|---|---|---|---|---|---|
| | | D | E | F | G | H |
| IIR/Cl-IIR | Blending ratio | 50/50 | 50/50 | 50/50 | 50/50 | 50/50 |
| Stearic acid | Blending amount (phr) | 1 | 1 | 1 | 1 | 1 |
| Zinc oxide | Blending amount (phr) | 5 | 5 | 5 | 5 | 5 |
| Carbon black (FEF) | Blending amount (phr) | 60 | 60 | 60 | 60 | 60 |
| Filler (scaly filler) | Kind or type | Talc | Talc | Talc | Talc | Talc |
| | Aspect ratio | 30 | 30 | 30 | 30 | 30 |
| | Average diameter (μm) | 7.5 | 7.5 | 7.5 | 7.5 | 7.5 |
| | Blending amount (phr) | 100 | 210 | 100 | 100 | 100 |
| Softening agent (Naphthen type processed oil) | Blending amount (phr) | 2 | 2 | 10 | 5 | 0 |
| Vulcanizing agent (resin vulcanizing agent) | Blending amount (phr) | 10 | 10 | 10 | 10 | 10 |
| Processing property | Molding property of corrugated tube | . | X | . | . | . |
| Property of sheet | Permeation of freon (90° C., mg/cm² day) | . | . | . | . | . |
| | Hardness test (HA) | 77 | 86 | 72 | 75 | 79 |

As for processing property with respect to molding of corrugated tube in Table 1, if corrugation can be molded favorably by injection molding, judgement is indicated by a symbol ".''(good). If the corrugation cannot be molded favorably, judgement is indicated by a symbol "x" (inferior).

And, hardness test or measurement is conducted by means of durometer, type A in accordance with JIS K6253. This hardness value directly affect vibration absorbing property (flexibility) of the inner rubber layer 16. If the hardness value is under HA80, the inner rubber layer of Example 1 and Comparative Example A may be judged good in the matter of hardness.

Here, gas permeability or gas permeation resistance is evaluated as follows. As shown in FIG. 5, a cup 30 in which freon gas (HFC-134a) is enclosed at low temperature, is closed its opening with vulcanized each of rubber sheets 28 formed from the same materials (at various composition) as Example 1 and Comparative Example A respectively and then placed in an oven 32 at 90° C. Then weight change (decreased amount) per day and per unit permeation surface area is calculated to obtain value of freon gas permeation amount.

Judgement is made based on Comparative Example A. If permeation of freon (value of freon gas permeation amount) is less than 50% of that of Comparative example A, judgement is indicated by a symbol ".''(good). If permeation of freon is in a range of 50% to 70% thereof, judgement is indicated by a symbol "."(acceptable). If permeation of freon is over 70% thereof, judgement is indicated by a symbol "x"(inferior).

Judging from the above results, it may sufficiently improve gas permeation resistance to contain or blend the scaly filler 21 in the inner rubber layer 16 according to the present invention. So, favorable gas permeation resistance is provided to the inner rubber layer 16, therefore, the hose 10 containing the scaly filler 21.

The form of the present invention herein described is to be taken as a preferred example thereof. In the present invention, according to the circumstances, other layer than the outer rubber layer 20 may be adapted to a cover layer, or the cover layer may be omitted. It is understood that according to application of the hose, various changes may be made in the present invention without departing from the spirit and scope of the present invention.

Figure 6:
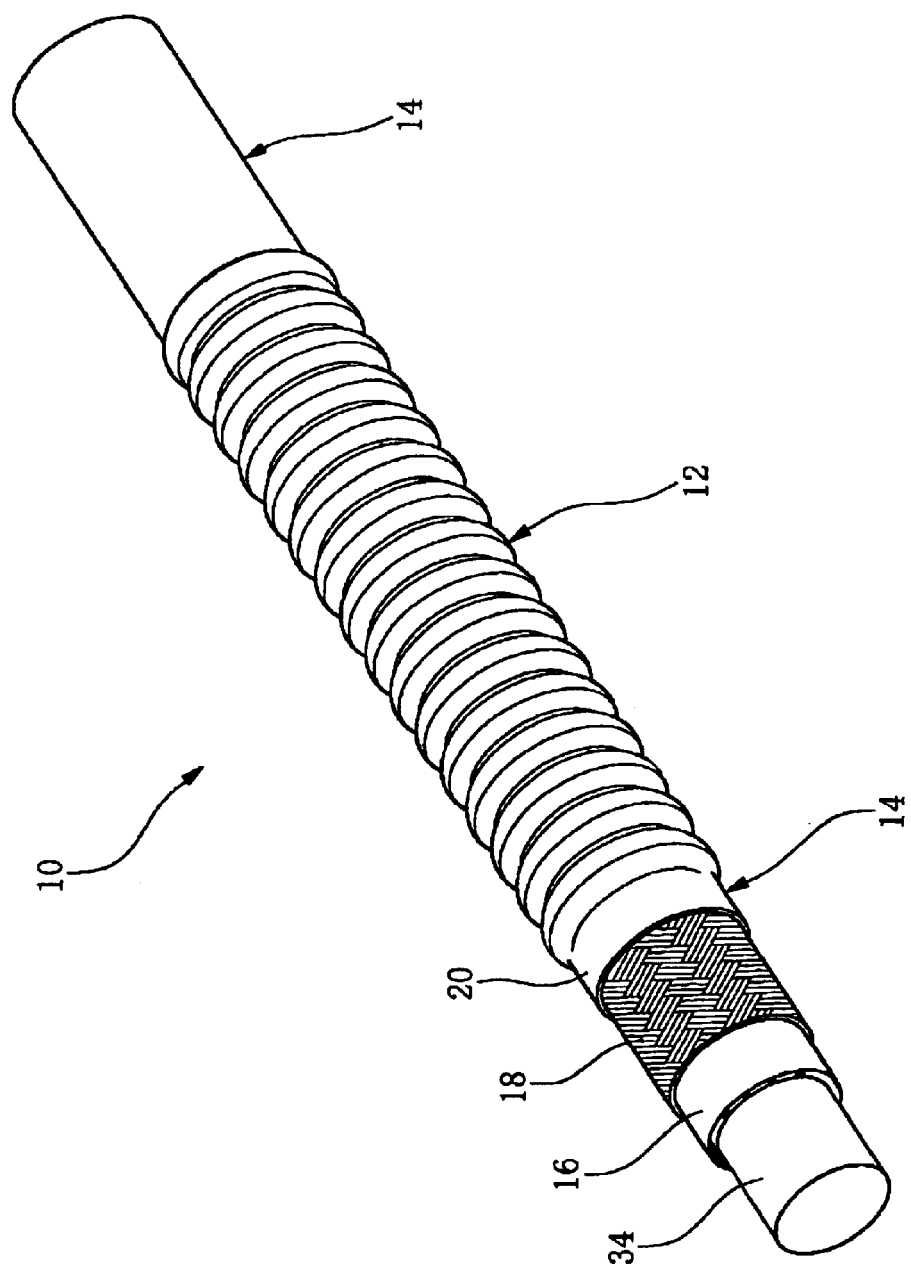
FIG. 6 is a partly cutaway perspective view of another vibration absorbing hose according to the present invention.
Figure 7:
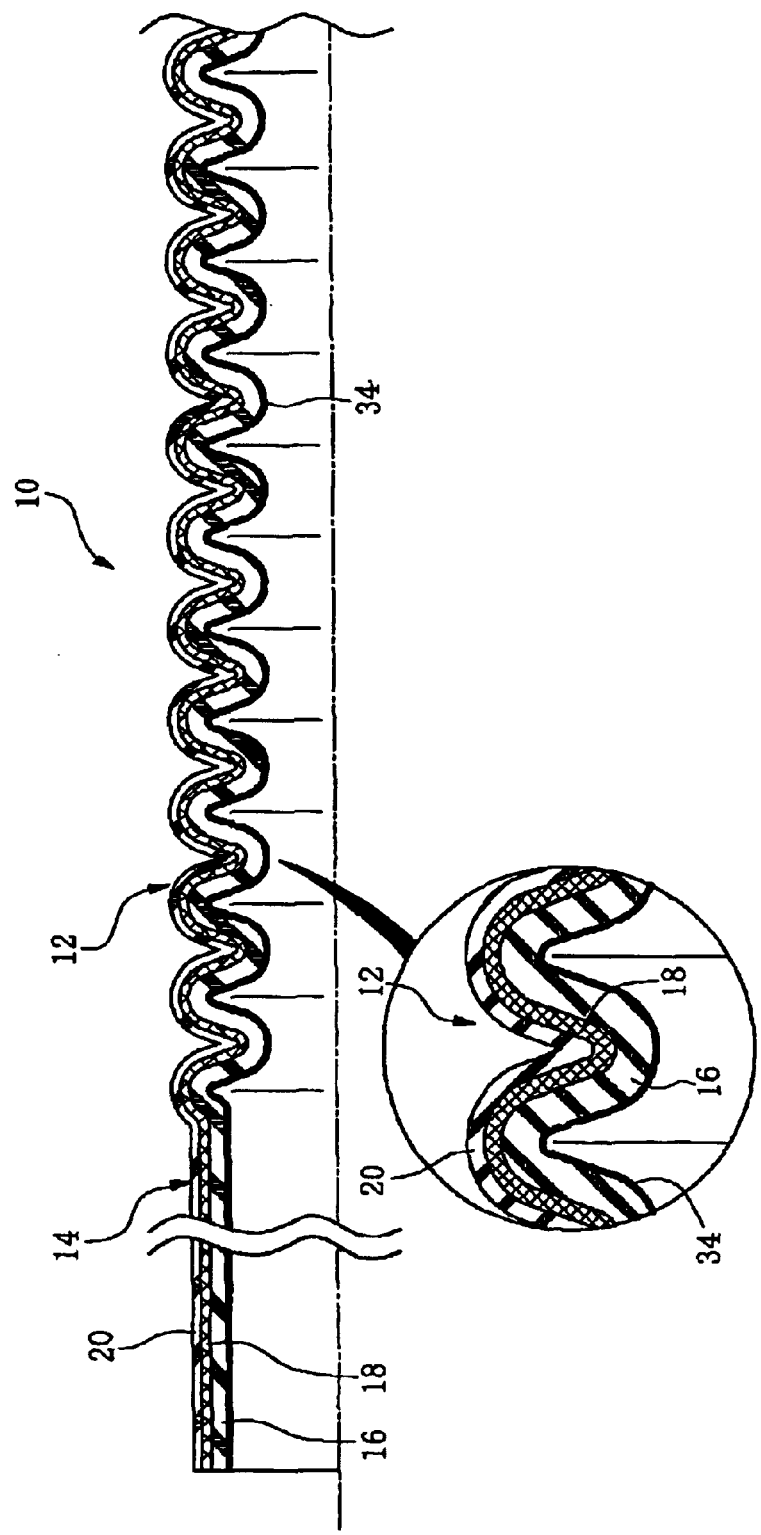
FIG. 7 is a sectional view of the another vibration absorbing hose, taken along a longitudinal direction thereof.
Figure 8:
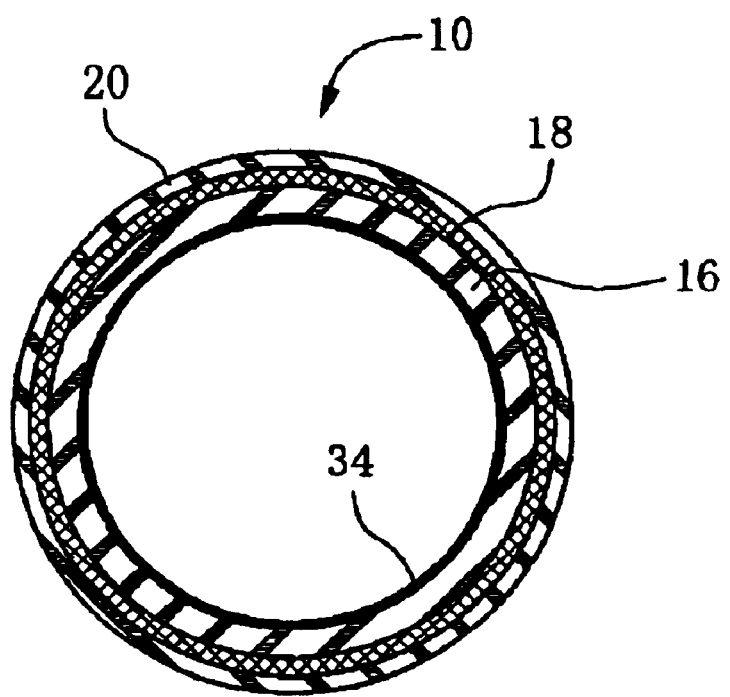
FIG. 8 is a sectional view of the another vibration absorbing hose, taken along a radial direction thereof.

For example, as shown in FIGS. 6, 7 and 8, in the hose 10, resin membrane or coating 34 is laminated in an inner surface of the inner rubber layer 16 by electrostatic spraying resin.

Here, the resin membrane 34 is formed from resin powder by electrostatic coating or spraying in wall thickness or thickness of 50 μm to 250 μm. For formation of this resin membrane 34 (or resin powder by electrostatic coating or spraying), the inner rubber layer 16 has volume resistivity value of maximum $1 \times 10^6 \Omega$-cm.

Figure 9:
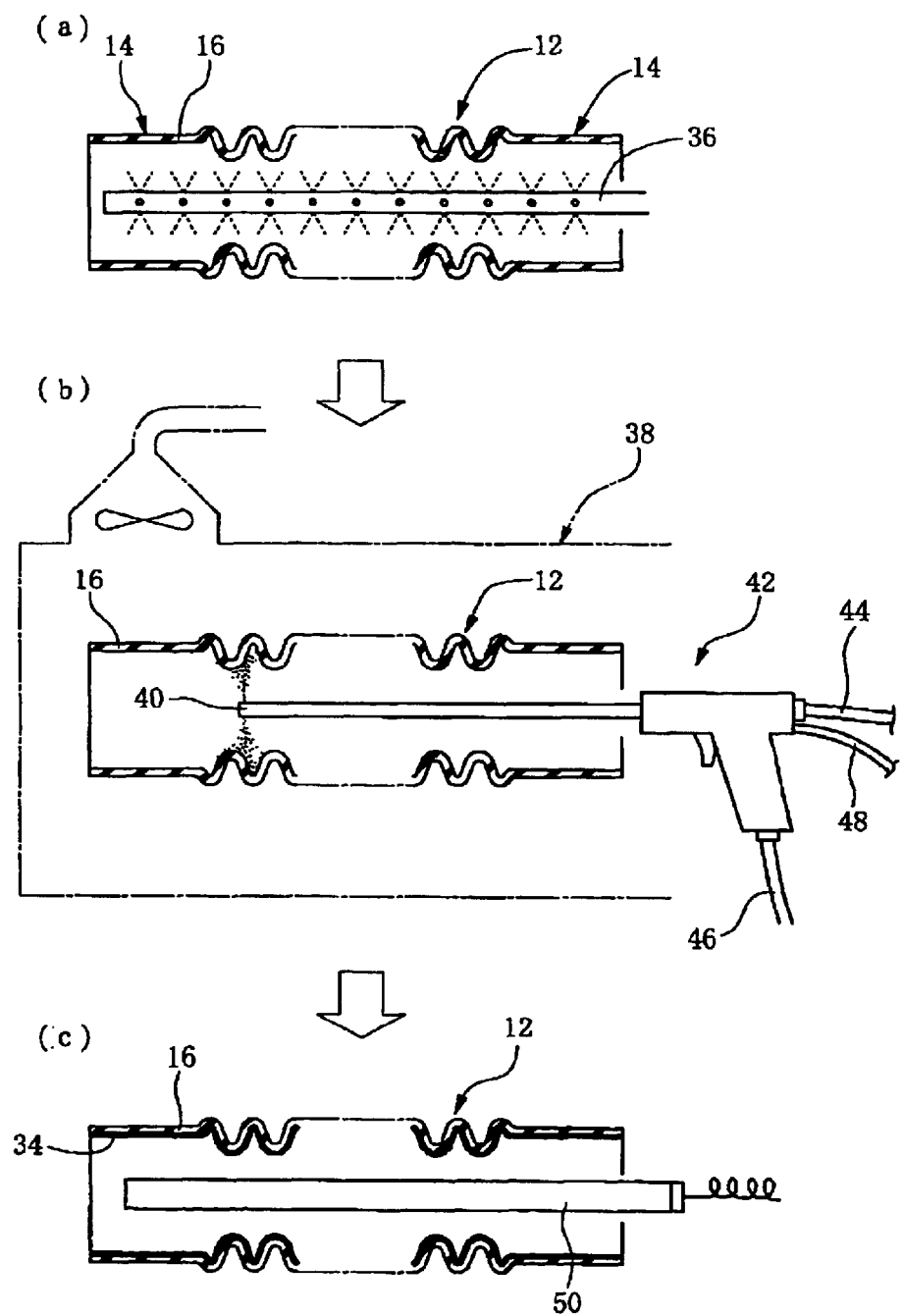
FIG. 9(a) is an explanatory view of formation method of resin membrane in the vibration absorbing hose, showing that adhesive agent is applied.
FIG. 9(b) is an explanatory view of formation method of the resin membrane in the vibration absorbing hose, showing that resin powder is sprayed.
FIG. 9(c) is an explanatory view of formation method of the resin membrane in the vibration absorbing hose, showing that the resin membrane is laminated.

The hose 10 shown in FIGS. 6, 7 and 8 may be formed in the same manner as the hose 10 shown in FIGS. 1 and 2, except resin membrane 34. The resin membrane 34 may be formed in the following manner. First, adhesive agent is applied to an inner surface of the inner rubber layer 16. The adhesive agent is applied, for example, in the following manner. As shown in FIG. 9(a), a spray nozzle 36 is inserted in the interior of the inner rubber layer 16, and then mist of the adhesive agent is sprayed onto the inner surface of the inner rubber layer 16 through a lot of jet perforations provided on the spray nozzle 36.

After the adhesive agent applied is dried, and then resin powder is electrostatic sprayed onto the inner surface of the inner rubber layer 16, for example, as follows. The inner rubber layer 16 is placed in the interior of a chamber 38 and the resin powder jets out onto the inner surface of the inner rubber layer 16 through a jet nozzle (nozzle spout) 40 on a tip end of a spray gun 42 in a direction perpendicular to an axis or in a radial direction (refer to FIG. 9(b)).

To the spray gun 42, a resin powder feed pipe 44 and an air pipe 46 are connected. And, the spray gun 42 is connected via a conductive wire 48 to a high-voltage generator. During electrostatic coating or spraying by the spray gun 42, the resin powder supplied to the spray gun 42 is jet sprayed with air which is also supplied thereto through the jet nozzle 40 on the tip end. At this time, the resin powder is sprayed in negatively or positively charged state.

On the other hand, the inner rubber layer 16 is held by a metal plate and earthed via the metal plate. Here, high negative voltage is applied to the spray gun 42, the resin powder is thereby jet sprayed in negatively charged state. At that time, the inner rubber layer 16 acts as counter electrode (positive electrode), the negatively charged resin powder flies toward the inner rubber layer in an electrostatic field generated upon application of high negative voltage, and attached to the inner surface of the inner rubber layer 16 to form resin coating or membrane thereon.

Next, the inner rubber layer 16 coated with the resin powder is taken out of the chamber 38, and heated in a heated oven or as shown in FIG. 9(c), heated by a heater 50 such as a far infrared ray heater which is inserted in the interior of the inner rubber layer 16 to heat and melt the resin powder. Then, the resin powder is cooled and thereby the resin membrane 34 is laminated in the inner surface of the inner rubber layer 16. After the resin membrane 34 is laminated in this manner, the inner rubber layer 16 is transferred to a processing step by the braiding machine 23.

And, here, as the resin membrane 34 is laminated with thickness 50 μm to 250 μm in the inner surface of the inner rubber layer 16, gas permeation resistance of the hose 10 may be remarkably enhanced.

EXAMPLE 2

Inner rubber layers of Example 2 (which are applied to the hose 10) and Comparative Examples B, C and D are formed from rubber materials blended as shown in Table 2 ("rubber composition") respectively (here, the scaly filler is not contained), and the resin membrane is formed in inner surfaces of the inner rubber layers from various resin materials as shown in Table 2 with various wall thickness or thickness by electrostatic coating or spraying. Then, each resin membrane 34 is evaluated with regard to coating property and permeation of freon gas.

Freon gas permeation test is conducted in the same manner as Example 1. That is to say, the rubber sheet 28 laminated with resin membrane is formed, vulcanized and then tested. The results are also shown in Table 2.

TABLE 2

|  |  | Comparative Examples | | | Example 2 | |
|---|---|---|---|---|---|---|
|  |  | B | C | D | A | B |
| Rubber composition | Polymer kind or type | IIR/C1-IIR | <- | <- | <- | <- |
|  | Stearic acid | 1 | <- | <- | <- | <- |
|  | Zinc oxide | 5 | <- | <- | <- | <- |
|  | FEF carbon black | 60 | <- | <- | <- | <- |
|  | MAF carbon black | — | <- | <- | <- | <- |
|  | Naphthen type processed oil | 5 | <- | <- | <- | <- |
|  | Paraffin type processed oil | — | <- | <- | <- | <- |
|  | Vulcanizing agent | Resin | <- | <- | <- | <- |
| Inner rubber layer | Volume resistivity (Ω-cm) | $1.6 \times 10^4$ | <- | <- | <- | <- |
| Resin membrane | Type | — | PA11 | <- | <- | <- |
|  | Thickness (mm) | — | 0.04 | 0.6 | 0.05 | 0.2 |
| Rubber/resin | Coating property | — | . | X | . | . |
|  | Permeation of freon (90° C., mg/cm² day) | 3.4 | 2 | 0.2 | 1.7 | 0.6 |
|  | Judgement | X | X | . | . | . |

|  |  | Example 2 | | | | |
|---|---|---|---|---|---|---|
|  |  | C | D | E | F | G |
| Rubber composition | Polymer kind or type | IIR/C1-IIR | <- | <- | EPDM | EPM |
|  | Stearic acid | 1 | <- | <- | 1 | <- |
|  | Zinc oxide | 5 | <- | <- | 5 | <- |
|  | FEF carbon black | 60 | <- | 40 | — | <- |
|  | MAF carbon black | — | <- | — | 90 | <- |
|  | Naphthen type processed oil | 5 | <- | <- | — | <- |

TABLE 2-continued

| | | | | | | |
|---|---|---|---|---|---|---|
| | Paraffin type processed oil | — | <– | — | 60 | <– |
| | Vulcanizing agent | Resin | <– | <– | S | PO |
| Inner rubber layer | Volume resistivity (Ω-cm) | 1.6 × 10⁴ | <– | 2.9 × 10⁹ | 9.6 × 10⁵ | 5.4 × 10⁵ |
| Resin membrane | Type | Fluoro-carbon resin | Pyrolytic boron nitride (PBN) | PA11 | <– | <– |
| | Thickness (mm) | 0.2 | 0.2 | 0.2 | 0.2 | 0.2 |
| Rubber/ resin | Coating property | . | . | . | . | . |
| | Permeation of freon (90° C., mg/cm² day) | 0.5 | 0.2 | 0.9 | 1.5 | 1.5 |
| | Judgement | . | . | . | . | . |

In the results of freon gas permeation test, judgement is made based on Comparative Example B. If permeation of freon (value of freon gas permeation amount) is equal to or less than 50% (1.7 mg/cm² day) of that of Comparative Example B, judgement is indicated by a symbol ".".(good). If permeation of freon is over 50% thereof, judgement is indicated by a symbol "x"(inferior).

As for coating property with respect to resin membrane in Table 2, if coating is made in uniform wall thickness or thickness, judgement is indicated by a symbol ".".(good). If it is difficult for coating to be made in uniform wall thickness or thickness (including the case that resin powder remains on a inner surface of the inner rubber layer), judgement is indicated by a symbol "x"(inferior). In borderline case, judgment is indicated by a symbol "."

Judging from the above results, it may sufficiently improve permeability resistance to freon to laminate the inner surface of the inner rubber layer with the resin membrane of thickness of 50 μm to 250 μm (specifically 50 μm to 200 μm). Therefore, the hose 10 including such resin membrane 34, as shown in FIGS. 6, 7 and 8 has not only excellent permeability resistance to gas, coupled with gas permeation resistance brought by the scaly filler 21, but also favorable pressure resistance brought by the pressure resistant reinforcement layer 18 laminated on the outer surface of the inner rubber layer 16 and favorable vibration absorbing property brought by the corrugated portion 12.

Figure 10:
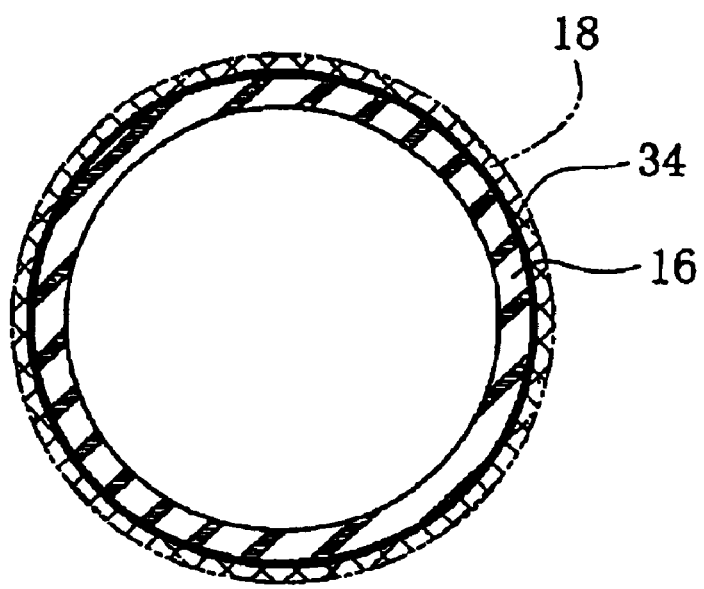
FIG. 10 is a sectional view of yet another embodiment of the vibration absorbing hose.
Figure 11:
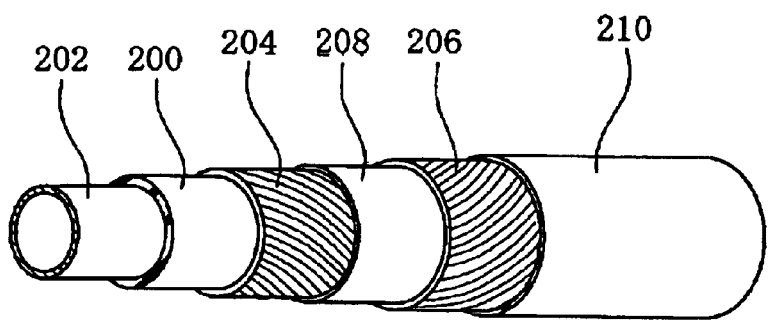
FIG. 11 is a perspective view of one of conventional vibration absorbing hoses.
Figure 12:
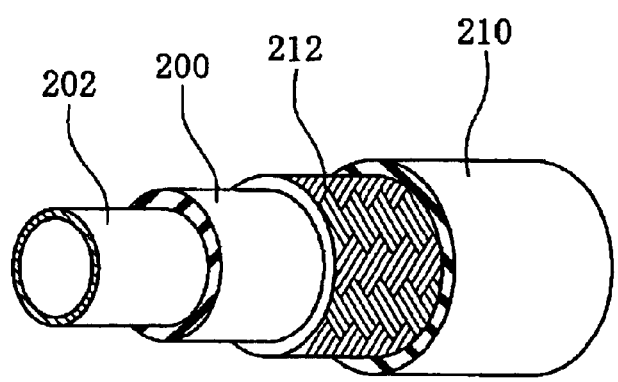
FIG. 12 is a perspective view of another conventional vibration absorbing hose having braided reinforcement layer.
Figure 13:
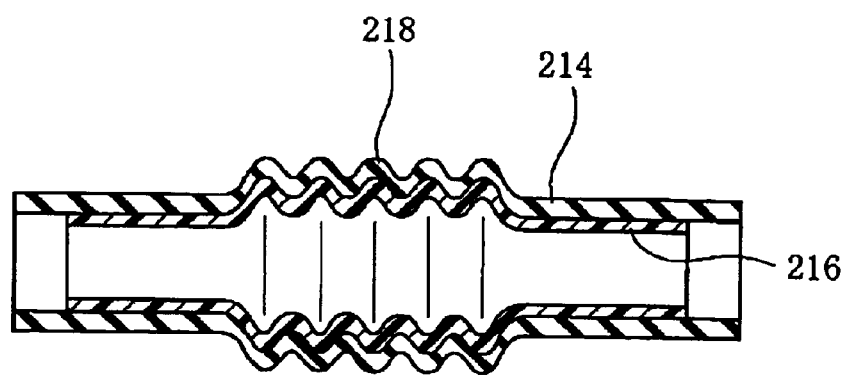
FIG. 13 is a sectional view of one vibration absorbing hose which is different from the conventional vibration absorbing hoses in FIGS. 11 and 12.

As shown in FIG. 10, the resin membrane 34 may be laminated on an outer surface of the inner rubber layer 16, instead of in the inner surface thereof, and the pressure resistant reinforcement layer 18 may be laminated on an outer side of the resin membrane 34.

We claim:

1. A vibration absorbing hose, comprising:
    tubular rubber layer having corrugations,
    pressure resistant reinforcement layer laminated on an outer surface side of the rubber layer and including reinforcing yarn or yarns provided along the corrugations, the reinforcing yarn or yarns forming the pressure resistant reinforcement layer shaped corresponding to the corrugations, and
    scaly filler contained in the rubber layer in an amount of 50 phr to 200 phr, the scaly filler being oriented in a stretching direction of the rubber layer.

2. The vibration absorbing hose as set forth in claim 1 wherein the scaly filler has an aspect ratio, which is defined by average diameter/thickness, of 2 to 90.

3. The vibration absorbing hose as set forth in claim 2 wherein the scaly filler has an average diameter of 0.1 μm to 700 μm.

4. The vibration absorbing hose as set forth in claim 1 wherein the scaly filler is formed from any material selected from a group consisting of talc, mica, sericite, montmorillonite, silica and clay.

5. The vibration absorbing hose as set forth in claim 1 wherein softening agent of maximum 5 phr is contained in the rubber layer.

6. The vibration absorbing hose as set forth in claim 1 wherein carbon black is contained in the rubber layer.

7. The vibration absorbing hose as set forth in claim 6 wherein contents of the carbon black is in the range of 20 phr to 150 phr.

8. The vibration absorbing hose as set forth in claim 1 wherein vulcanizing agent for the rubber layer is sulfur or resin, and a blending amount of the vulcanizing agent is in the range of 20 phr to 150 phr.

9. The vibration absorbing hose as set forth in claim 1 further comprising:
    a resin membrane laminated in an inner surface of the rubber layer, or on an outer surface of the rubber layer and in an inner side of the pressure resistant reinforcement layer.

10. The vibration absorbing hose as set forth in claim 9 wherein the resin membrane has a thickness of 50 μm to 250 μm.

11. The vibration absorbing hose as set forth in claim 9 wherein the rubber layer has a volume resistivity of maximum 1×10⁶Ω-cm.

12. The vibration absorbing hose as set forth in claim 1 wherein the reinforcing yarns are braided along the corrugations to form the pressure resistant reinforcement layer shaped corresponding to the corrugations.

13. The vibration absorbing hose as set forth in claim 1 wherein bursting pressure of the vibration absorbing hose is minimum 1 MPa.

14. The vibration absorbing hose as set forth in claim 1 wherein construction of the vibration absorbing hose is suitable for plumbing hose to be arranged in an engine room of a motor vehicle.

* * * * *